C. F. DILKS.
TENSION TESTING DEVICE FOR SEWING MACHINE THREADS.
APPLICATION FILED OCT. 3, 1917.
1,305,780.
Patented June 3, 1919.
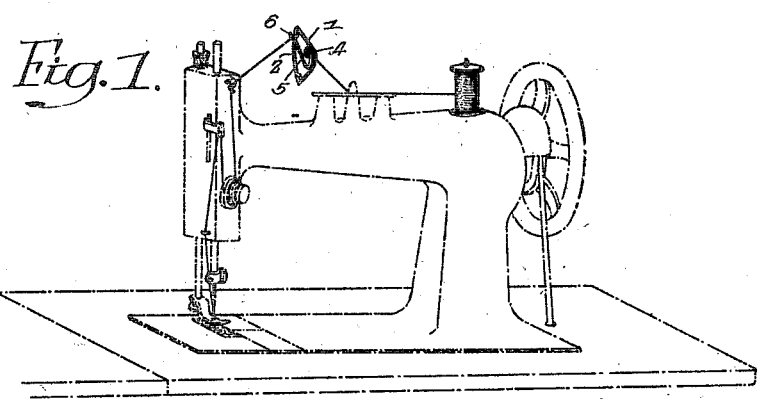
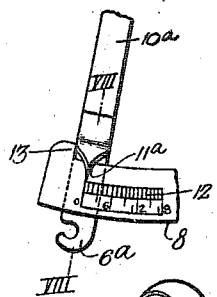
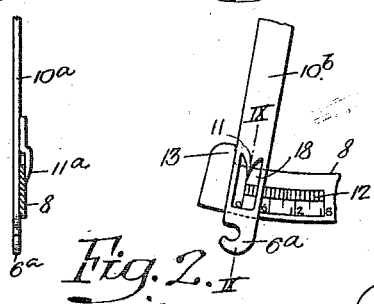
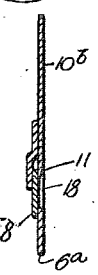
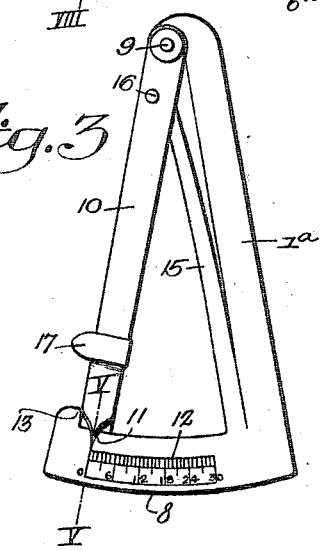
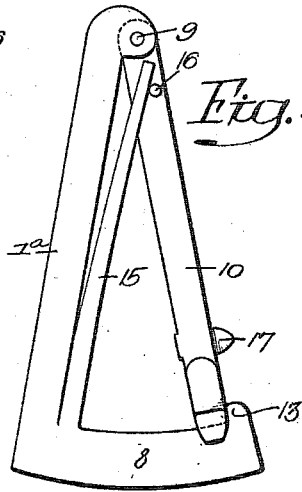
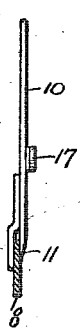
Inventor:—
Charles F. Dilks.
by his Attorneys,
Howson & Howson

UNITED STATES PATENT OFFICE.

CHARLES F. DILKS, OF BRIDGETON, NEW JERSEY, ASSIGNOR OF ONE-HALF TO I. W.
                     GOLDBERG, OF BRIDGETON, NEW JERSEY.

TENSION-TESTING DEVICE FOR SEWING-MACHINE THREADS.

1,305,780.                    Specification of Letters Patent.      Patented June 3, 1919.

Application filed October 3, 1917.  Serial No. 194,579.

*To all whom it may concern:*

Be it known that I, CHARLES F. DILKS, a citizen of the United States, residing in Bridgeton, Cumberland county, New Jersey, have invented Improved Tension-Testing Devices for Sewing-Machine Threads, of which the following is a specification.

The object of my invention is to provide a simple hand device having a spring controlled member to be placed in hooked engagement with the thread of a sewing machine to ascertain the tension thereof, and to enable the operator to regulate the tension of such thread with respect to a scale which my improved tension testing device carries.

The salient features of my invention may be embodied in devices of various forms, some of which I have illustrated, and these and other details of my invention are more fully described hereinafter, reference being had to the accompanying drawings, in which:

Figure 1, is a perspective view showing one form of my improved tension testing devices in position of use in connection with the thread of a sewing machine; the latter being indicated by broken lines.

Fig. 2, is a face view of the device shown in Fig. 1.

Fig. 3, represents another form of tension testing device within the scope of my invention.

Fig. 4, is a rear view of the structure shown in Fig. 3.

Fig. 5, is an edge view partly in section on the line V—V, Fig. 3.

Figs. 6 and 7, are fragmentary views illustrating modified details applicable for use with structures of the type shown in Figs. 3 and 4.

Fig. 8, is a view similar to Fig. 5, partly in section on the line VIII—VIII, Fig. 6, and Fig. 9, is a sectional view on the line IX—IX, Fig. 7.

The tension device shown in Figs. 1 and 2, comprises a plate member 1, having one end provided with a guard 2, adjacent which a scale 3 is marked on the face of the plate. Anchored to the plate at 4 is a spring arm 5, having a hook 6 at its opposite end; the hooked end passing under the guard 2 and lying adjacent the scale 3 so that any movement of the spring arm occasioned by the tension of the thread may be clearly indicated and ascertained by observing the position of said arm 5 with respect to the scale, which may have its markings numbered in order that the tension regulation may be facilitated.

Manipulation of the usual tension controlling devices of the sewing machine will then be effected to increase or decrease the tension, as may be desired, to have it conform to the required tension for the work in hand.

In Figs. 3 and 4, I have shown a modified construction, in which 1ª indicates the main supporting bar of a substantially L-shaped structure having an arm 8 preferably curved in the arc of a circle struck from the pivot point 9 of a movable arm 10 having a pointed end 11 disposed adjacent scale markings 12 on the arm 8; the latter being provided with a stop 13 to engage the arm 10, when the latter is at the zero point. To hold the movable arm at the zero position and to render the same active to indicate tension on a thread, I provide a spring 15 in engagement with the same, which may be formed by partially slitting the metal at the side of the arm 1ª and bending the same out therefrom to form a curved arm under tension; lying in engagement with a projection 16 on the movable arm 10.

The arm 10 is provided with a hook 17 for engagement with the thread; such hook being disposed above the pointer 11 adjacent the scale whereby the latter may be read. In the structure shown in Figs. 6 and 8, the movable arm 10ª is provided with a hooked end 6ª extending beyond the curved arm 8, and the pointer 11ª may be a separate piece carried thereby and overlying the scale in the manner indicated in Fig. 6, and forming with the arm 10ª the means for keeping the latter in operative position with reference to the scale arm 8.

In the structure shown in Figs. 7 and 9, the movable arm 10ᵇ may extend wholly over the arm 8 carrying the scale; being cut out at 18 so that the scale markings may be readily observed. This structure has a guard beneath the arm 10ᵇ to keep it in operative position with reference to the scale like the device shown in Figs. 3 and 4, and is preferably provided with a hooked end 6ª like the device shown in Figs. 6 and 8.

I claim:

1. An improved thread tension testing device consisting of a relatively thin flat plate fashioned with a segment at one end; said segment being provided with a scale, and a separate spring tensioned arm secured to the end portion of the plate opposite to said segment, the point of attachment of the spring tensioned arm being substantially the center from which the segment is struck, said spring tensioned arm being normally inclined relatively to the inclined side of the plate and having an open hook to readily receive the thread.

2. An improved thread tension testing device consisting of a unitary relatively thin flat plate fashioned with a segment at one end; said segment being provided with a scale, and a separate spring tensioned arm secured to the end portion of the plate opposite to said segment, the point of attachment of the spring tensioned arm being substantially the center from which the segment is struck, said spring tensioned arm being normally inclined relatively to the inclined side of the plate and having an open hook to readily receive the thread, and a guard adjacent the scale for said spring tensioned arm.

CHARLES F. DILKS.